July 15, 1941.  G. B. SHIRLEY ET AL  2,249,500
SKIN CLEANING DEVICE
Filed Feb. 12, 1940
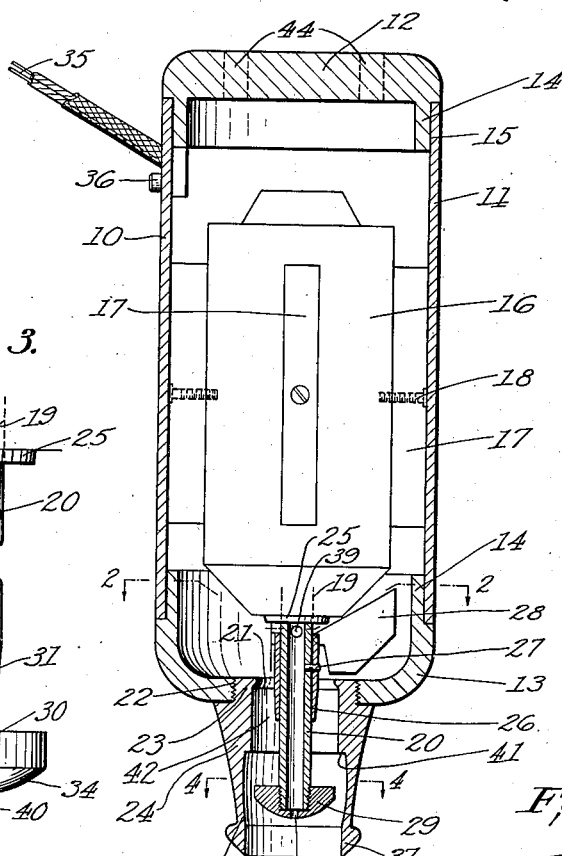
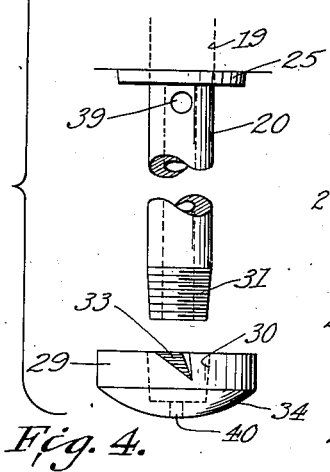
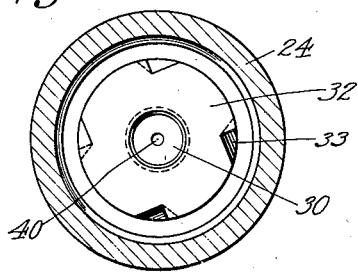
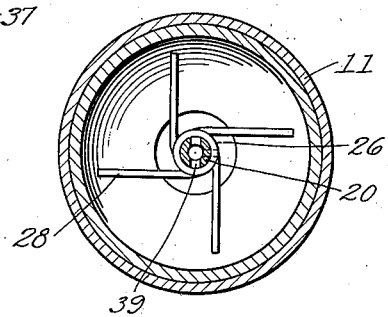
Inventor
Guy B. Shirley
G. Thomas Strickel
By Cushman Darby & Cushman
Attorneys Patented July 15, 1941

2,249,500

UNITED STATES PATENT OFFICE 2,249,500

SKIN CLEANING DEVICE

Guy B. Shirley, San Antonio, Tex., and George T. Strickel, Oklahoma City, Okla., assignors to La Vair Corp., San Antonio, Tex.

Application February 12, 1940, Serial No. 318,656

8 Claims. (Cl. 128—24.1)

The present invention relates to a skin cleaning device and more particularly to improved means for efficiently removing cleansing cream, blackheads, pore dirt and other waste matter from the skin and depositing the same within the device.

One of the important features of the invention consists in providing a skin cleaning device with suction means for removing dirt and other foreign matter from the skin, and associating with the suction means, means for supplying warm or hot air to the surface being treated during the operation of the device.

Another object is to provide the device with a cleaning cup having its outer edge beveled or so shaped as to constitute scraping, squeezing or pressing means arranged to contact with the skin and assist the suction means in eliminating dirt and excess waste matter as well as the cleansing cream from the skin.

A further object consists in associating with the suction cleaning device a revoluble distributing member which is mounted within the cleaning cup and spaced from the outer scraping edge or surface thereof so as to be at all times out of contact with the skin, and which during the operation of the device, generates outwardly directed or centrifugal air currents which act to direct and deposit the skin dirt, waste matter and cleansing cream removed from the surface being treated by the suction means, against the inner wall of the cup so as to adhere thereto.

Another object comprehends the provision of means in the cleaning cup for preventing dirt and cleansing cream removed from the skin by the suction means and the scraping means, from being conducted through the cup and into the casing in which the motor and suction fan are housed.

Other objects and advantages of the invention will become apparent from the following description when taken in conjunction with the accompanying claims and drawing.

Referring to the drawing in which is shown a preferred embodiment of the invention:

Figure 1 is a vertical sectional view of the skin cleaning device embodying our invention.

Figure 2 is a sectional view taken substantially on the line 2—2 of Figure 1.

Figure 3 is a detailed disassembled view of the distributing member and the tubular end portion of the motor shaft.

Figure 4 is a sectional view taken substantially along the line 4—4 of Figure 1.

Referring to the drawing in which like numerals indicate like parts in the several views, 10 designates a light and portable casing which may be of any suitable size and shape, and as shown, comprises a metallic cylindrical band 11 closed at its inner and outer ends by the plugs or closure members 12 and 13 respectively. These members have inwardly opposed reduced annular flanges 14 to which are connected the adjacent ends of the band 11 as at 15, in any suitable manner, such as by tight frictional joints or by welding means.

An electric motor 16 of any well-known and standard type is mounted within the casing 10 and may firmly be maintained in position by four circumferentially spaced rubber strips or members 17 secured to the motor in any suitable manner such as by the screws 18. The motor shaft 19 is provided with an outwardly extending tubular portion 20 which projects through an opening 21 in the closure member 13. The wall of the opening 21 is preferably threaded as at 22 so as to receive the complementary threaded reduced portion 23 of a cleaning cup 24 into which the tubular portion 20 of the shaft extends. The inner end of the tubular portion 20 adjacent the motor may be provided with a collar 25 for supporting the same.

A sleeve 26 is secured to the tubular portion 20 of the shaft by pin 27 so as to be rotatable therewith and has spaced outwardly extending radial arms or ribs 28 which constitute a fan for creating a suction within the casing 10 during the operation of the motor. The vacuum chamber extends from the end 38 of the cup to that portion of the suction fan 28 where the fan ceases to exert a partial vacuum. A distributing member or disc 29 is provided with a medially disposed tapered threaded socket 30 to which is connected the complementary tapered threaded portion 31 of the tubular shaft 20 (Figure 3). The distributing member 29 may be made of any suitable plastic or rubber composition and has its inner face 32 provided with spaced circumferentially disposed grooves or slots 33. The outer face 34 of the distributing member may be of any shape and is shown as convexed. The distributing member 29 is secured to the tubular portion 20 of the shaft so that it together with the suction fan 28 rotate in a counter-clockwise direction when the motor is in operation. Current supplied to the motor 16 through the lead-in wires 35 may be controlled by a push slide switch 36.

The cup 24 is preferably bell-shaped and may be made of hard rubber composition or any other suitable non-yielding plastic material. The outer end of the cup is beveled as at 37 to provide an annular scraping edge 38 arranged to contact and to be moved over the surface of the skin to be treated during the operation of the device so as to squeeze or press the skin and remove blackheads and pore dirt therefrom.

The tubular portion 20 of the motor shaft is provided with one or more radial openings 39 located to the rear of the suction fan 28 for conducting warm or hot air generated by the motor 16, through the tubular member 20 and a restricted central opening 40 formed in the distributing member 29, so as to deliver this warm air onto the skin when the machine is in operation. The holes 39 are located to the rear of the fan 28 and may if desired, be formed in a portion of the shaft 20 which extends into the motor housing and to the rear of the collar 25 so as to increase the temperature of the hot air delivered to the parts to be treated. Thus it will be seen that by reason of the location of the openings 39 and the discharge of the warm or heated air through the tubular shaft portion 20 and the opening 40, the heat generated by the motor instead of being dissipated is utilized for a profitable purpose. If it is not desired to conduct hot air to the face or surface being treated, then a distributing member 29 having the opening 40 closed may be used. The cleaning cup 24 has an offset shoulder 41 which communicates the outer end of the cup with a reduced passage 42. The passage 42 is slightly larger than the external diameter of the distributing member 29 so that the cup may be readily connected or removed from the casing 10 without disturbing the member 29 and its associated parts. The distributing member 29 may be adjustably positioned relative to the outer edge 38 and the skin but never contacts with the skin, and is maintained at all times in proper spaced relation to the inner concaved wall 43 of the cup as well as the outer edge 38 and the shoulder 41 thereof. The inner plug or closure member 12 of the casing may be provided with openings 44 for permitting the discharge of air from the casing.

In operating the device the face or surface of the skin to be treated may first have applied thereto a cleansing cream. The switch 36 is then actuated to start the motor 16 and the scraping edge 38 of the cup 24 is moved into contact with the skin or face. The suction created by the fan 28 causes the skin to be slightly drawn into the cup 24 and the edge 38 then acts to squeeze or press blackheads and pore dirt out of the skin and the skin pores as it is moved over the surface being treated. Thus the scraper materially assists the suction means 28 to remove dirt and the cleansing cream from the parts treated. As the distributing member 29 is simultaneously rotated with the fan 28, the spaced notches or slots 33 set up outward or radial air currents which direct the material removed from the skin as it passes through the cup between the outer edge thereof and the shoulder 41, to be deposited and distributed onto the inner wall 43 of the cup. During this operation the offset shoulder 41 in the cup acts to restrain or prevent dirt, waste material, or cleansing cream from being conducted into the restricted opening 42 and the interior of the casing, thus providing means for precluding the dirt and other foreign matter from contacting the fan 28 or parts of the motor. At the same time hot or warm air generated by the motor is conducted through the radial openings 39 into the tubular portion of the shaft 20 and discharges through the opening 40 into contact with the surface of the skin being treated. The warm or hot air drawn into the cup 24 during the operation of the machine acts to somewhat decrease the suction or vacuum, and this decrease can and is taken care of by increasing the suction fan area. In other words, when the machine is in operation the vacuum or suction pull on the skin will be so regulated by the suction fan and the holes for conveying the heated air from the motor to the surface being treated, as to insure each operator or user being provided with the proper amount of suction pressure and warm air as is necessary for the efficient operation of the device. If it is not desired to apply warm air to the surface of the skin during the cleaning operation then the opening 40 in the distributing member 29 may be closed. The skin cleaning device is light and portable so as to be conveniently handled by the operator or user and applied to the surface of the skin being treated.

Thus it will be seen that simple, efficient and economical means are provided for removing cleansing cream and skin dirt from the surface being treated, in which the outer edge 38 of the cup constitutes a scraper or squeezing surface when the cup is applied, and the suction created by the fan 28 draws the skin into the cup to effect a scraping, squeezing or pressing of the skin and skin pores, for the purpose of eliminating dirt, excess waste matter as well as the cleansing cream that has been applied to the skin or face. This foreign matter as it is removed impinges on the inner wall 43 of the cup due to the air currents generated by the rotation of the distributing member 29. When the cleaning operation is completed, and the motor turned off, the cup 24 may be readily removed from the casing so as to be cleaned and then reapplied for further use. Manifestly the device may be used to clean the face or portions of the skin when either a cleansing cream is first applied or without the application of the cream. Each of the end closure members 12 and 13 may be of such shape and size relative to the band or wall 11 as to constitute means arranged to be conveniently gripped by the user for operating the device.

It is to be understood that the form of the invention shown and described is merely illustrative of a preferred embodiment and that such changes may be made as fall within the purview of one skilled in the art without departing from the spirit of the invention and the scope of the appended claims.

We claim:

1. A skin cleaning device of the class described including a casing having an open end, a cup connected to the open end of the casing, said cup having an outer edge arranged to engage the skin, an electric motor mounted in said casing, a drive shaft extending from one end of the motor, said shaft having a tubular portion projecting a limited distance into said cup, a suction fan mounted on said tubular portion adjacent the motor, a distributing member mounted on the tubular portion of said shaft so as to be rotatable therewith and positioned within the cup, said distributing member being spaced at all times from the outer edge of the cup so as not to engage the skin, means for controlling the operation of said motor, the parts being constructed and arranged so that in operation when the cup is brought into contact with the surface to be cleaned, the fan creates a suction which acts to remove the dirt from the skin, and means on the distributing member upon the rotation thereof for producing air currents, which impinge the dirt as it is removed from the skin against the inner wall of the cup.

2. A skin cleaning device of the class described including a casing having an open end, a cup connected to the open end of the casing, said cup having an outer beveled edge arranged to engage the skin, an electric motor mounted in said casing, a drive shaft extending from one end of the motor, said shaft having a tubular portion projecting a limited distance into said cup, a suction fan mounted on said tubular portion adjacent the motor, a distributing member mounted on the tubular portion of said shaft so as to be rotatable therewith and positioned within the cup, said distributing member being spaced at all times from the outer edge of the cup so as not to engage the skin, means for controlling the operation of said motor, the parts being constructed and arranged so that in operation when the cup is brought into contact with the surface to be cleaned, the fan creates a suction which acts to remove the dirt from the skin, the edge of the cup constituting a scraper means for assisting in the removal of blackheads and pore dirt from the skin, and means on the distributing member upon the rotation thereof for producing air currents which impinge the dirt as it is removed from the skin against the inner wall of the cup.

3. A skin cleaning device of the class described including a casing having an open end, a cup connected to the open end of the casing, said cup having an outer beveled edge arranged to engage the skin, an electric motor mounted in said casing, a drive shaft extending from one end of the motor, said shaft having a tubular portion projecting a limited distance into said cup, a suction fan mounted on said tubular portion adjacent the motor, a distributing member mounted on the tubular portion of said shaft so as to be rotatable therewith and positioned within the cup, said distributing member being spaced at all times from the outer edge of the cup so as not to engage the skin, means for controlling the operation of said motor, the parts being constructed and arranged so that in operation when the cup is brought into contact with the surface to be cleaned, the fan creates a suction which acts to remove the dirt from the skin, the edge of the cup constituting a scraper for assisting in the removal of blackheads and pore dirt from the skin, means on the distributing member upon the rotation thereof for producing air currents which impinge the dirt as it is removed from the skin against the inner wall of the cap, and means for conducting hot air generated by the motor through the tubular portion of the shaft and into contact with the skin during the operation of the device.

4. A skin cleaning device of the class described including a casing having an open end, a cup connected to the open end of the casing, said cup having an outer beveled edge arranged to engage the skin, an electric motor mounted in said casing, a drive shaft extending from one end of the motor, said shaft having a tubular portion projecting a limited distance into said cup, a suction fan mounted on said tubular portion adjacent the motor, a distributing member mounted on the tubular portion of said shaft so as to be rotatable therewith and position within the cup, said distributing member being spaced at all times from the outer edge of the cup so as not to engage the skin, means for controlling the operation of said motor, the parts being constructed and arranged so that in operation when cleansing cream is applied to the skin and the cup is brought into contact with the surface to be cleaned, the fan creates a suction which acts to remove the cream and dirt from the skin, the edge of the cup constituting a scraper which assists in the removal of blackheads and pore dirt from the skin, means on the distributing member upon the rotation thereof for producing centrifugal air currents which impinge the cream and dirt removed from the skin against the inner wall of the cap, and means for preventing the cream and dirt from passing through the cup into the casing during the operation of the device.

5. A skin cleaning device of the class described including a casing having an open end, a cup connected to the open end of the casing, said cup having an outer beveled edge arranged to engage the skin, an electric motor mounted in said casing, a drive shaft extending from one end of the motor, said shaft having a tubular portion projecting a limited distance into said cup, a suction fan mounted on said tubular portion adjacent the motor, a distributing member mounted on the tubular portion of said shaft within the cup, said distributing member being spaced at all times from the outer edge of the cup so as not to engage the skin, means for controlling the operation of said motor, the parts being constructed and arranged so that in operation when cleansing cream is applied to the skin and the cup is brought into contact with the surface to be cleaned, the fan creates a suction which acts to remove the cream and dirt from the skin, the edge of the cup constituting a scraper which assists in the removal of blackheads and pore dirt from the skin, means on the distributing member upon the rotation thereof for producing centrifugal air currents which impinge the cream and dirt removed from the skin against the inner wall of the cap so as to adhere thereto, and means for conducting warm air from the casing into contact with the skin during the operation of the device.

6. A skin cleaning device of the class described including a casing having an open end, a cup connected to the open end of the casing, said cup having an outer beveled edge arranged to engage the skin, an electric motor mounted in said casing, a drive shaft extending from one end of the motor, said shaft having a tubular portion projecting a limited distance into said cup, a suction fan mounted on said tubular portion adjacent the motor, a distributing member mounted on the tubular portion of said shaft within the cup and having spaced notches on its inner surface, said distributing member being spaced at all times from the outer edge of the cup so as not to engage the skin, means for controlling the operation of said motor, the parts being constructed and arranged so that in operation when cleansing cream is applied to the skin and the cup is brought into contact with the surface to be cleaned, the fan creates a suction which acts to remove the cream and dirt from the skin, the edge of the cup constituting a scraper which assists in the removal of blackheads and pore dirt from the skin, and said spaced notches on the distributing member forming air passages which upon the rotation thereof produces centrifugal air currents which impinge the cream and dirt removed from the skin against the inner wall of the cup so as to adhere thereto, said tubular shaft portion having means communicating with the casing adjacent the motor for conducting warm air generated by the motor through the tubular portion and into contact with the skin during the operation of the device.

7. In combination with a skin cleaning device having a casing, a motor mounted in the casing, vacuum means within the casing for removing dirt from the skin, a cup connected to one end of the casing, said cup having a beveled outer edge arranged to engage the skin to assist the vacuum means in removing blackheads and pore dirt therefrom, said motor having a revoluble shaft provided with a tubular portion extending into the cup, and a member mounted on the shaft and positioned within the cup for impinging the dirt removed from the skin against the inner wall of the cup, said member being spaced at all times from the outer edge of the cup so as not to engage the skin, the tubular portion of the shaft adjacent the motor having a radial opening whereby warm air generated by the motor is conducted through the tubular portion of the shaft into contact with the skin during the operation of the device.

8. In combination with a skin cleaning device having a casing, a motor mounted in the casing, vacuum means within the casing for removing the dirt from the skin, means for controlling the operation of the vacuum means, a cleaning cup connected to the casing and arranged to be moved over the surface of the skin to be treated, said motor having a revoluble drive shaft provided with a tubular portion extending into said cup, and a member mounted on the shaft and positioned within the cup for depositing the dirt removed from the skin by the suction means onto the wall of the cup, said member being spaced at all times from the outer edge of the cup so as not to engage the skin, the tubular portion of the shaft adjacent the motor having a radial opening whereby the warm air generated by the motor is conducted through the shaft into contact with the skin during the operation of the device.

GUY B. SHIRLEY.
GEORGE T. STRICKEL.